United States Patent [19]

Okumura

[11] Patent Number: 5,784,659
[45] Date of Patent: *Jul. 21, 1998

[54] FILM FEEDING APPARATUS

[75] Inventor: Yoichiro Okumura, Tokyo, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 724,023

[22] Filed: Sep. 16, 1996

[30] Foreign Application Priority Data

Oct. 6, 1995  [JP]  Japan ................. 7-259992

[51] Int. Cl.⁶ ............................................. G03B 1/18
[52] U.S. Cl. ................................. 396/409; 355/75
[58] Field of Search .......................... 396/387, 392, 396/406, 409, 410; 355/75

[56] References Cited

U.S. PATENT DOCUMENTS

| | | | |
|---|---|---|---|
| 4,443,084 | 4/1984 | Harada et al. | 354/173.11 |
| 4,954,859 | 9/1990 | Kitazawa | 354/173.11 |
| 5,210,562 | 5/1993 | Miyazawa et al. | 354/400 |
| 5,249,009 | 9/1993 | Tsuru et al. | 354/173.1 |
| 5,452,055 | 9/1995 | Smart | 355/68 |
| 5,506,648 | 4/1996 | Kazami et al. | 354/173.11 |
| 5,543,878 | 8/1996 | Muakami | 354/173.1 |
| 5,574,529 | 11/1996 | Akira | 396/568 |
| 5,576,785 | 11/1996 | Kazami et al. | 396/397 |

FOREIGN PATENT DOCUMENTS

| 123828 | 7/1985 | Japan. |
|---|---|---|
| 138526 | 10/1992 | Japan. |

*Primary Examiner*—Daniel P. Malley
*Attorney, Agent, or Firm*—David E. Dougherty, Esquire

[57] ABSTRACT

A film feeding apparatus of a camera using a film having two perforations per frame detects the end of the film by detecting the final frame of the film. The film feeding apparatus comprises a detecting means for detecting the passage of a first perforation to detect a feeding speed of the film, a setting means for setting a predetermined limit value (limiter time) in accordance with the feeding speed, a film end determining means for determining that the film has ended when the passage, of a second perforation is not detected within the set limit value while the film is wound up. The film feeding apparatus feeds the film in accordance with a predetermined procedure of one-frame winding up and rewinds the film when the film has ended.

15 Claims, 10 Drawing Sheets

| TIMER VALUE (ms) | LIMITER VALUE (ms) |
|---|---|
| 0 ~ 10 | 80 |
| 10 ~ 15 | 90 |
| 15 ~ 20 | 100 |
| 20 ~ 25 | 120 |
| 25 ~ 30 | 130 |
| 30 ~ 35 | 140 |
| 35 ~ 40 | 150 |
| 40 ~ 50 | 160 |
| 50 ~ 70 | 170 |
| 70 ~ | 300 |

*FIG. 11*

FILM FEEDING APPARATUS

BACKGROUND OF THE INVENTION

1. Field of the Invention

This invention relates to a film feeding apparatus of a camera and more particularly to a film feeding apparatus which detects a film end and stops a motor before the film is stretched at the film end.

2. Description of the Related Art

The following are examples of conventional technologies of film end detection and motor stop control of a camera.

U.S. Pat. No. 4,954,859 discloses that a film end is detected when no perforation signal outputted in accordance with the movement of the film has been detected for a predetermined time.

In U.S. Pat. No. 4,443,084 and Japanese Laid-Open Patent Application Publication No. Sho 60-123828, a lapse of time counted from the start of motor drive is calculated. When a film winding process is not finished after a time period necessary for winding up one frame has passed, the film end is detected.

Further, Japanese Laid-Open Patent Application Publication No. Hei 6-138526 discloses that a film end, particularly of a new type of film is recognized when only one perforation is detected after a predetermined time for detecting two perforations has past.

Generally, film feeding control is much influenced by disturbances, which is different from autofocus lens drive control, zoom drive control, or the like.

In the lens drive and the zoom drive, mechanical drive causes the disturbances. For example, mechanisms have a certain degree of inherent characteristics against temperature, humidity, supply voltage, or the like. These influences can be predicted when the camera is designed.

However, in the case of film feeding control, film bases have various degrees of hardness, which may change after the camera is designed. Generally, the film base tends to become harder as the temperature decreases and the humidity lowers. Accordingly, the film feeding speed slows down and it will take time to feed the film.

In the conventional art described in above-mentioned U.S. Pat. Nos. 4,954,859 and 4,443,084, Japanese Laid-Open Patent Application Publication No. Sho 60-123828 and the like, the film end is detected by taking into consideration such conditions as low temperature, low humidity, and low voltage to predict the speed of film feeding and by adding certain allowances to the time periods for detecting the perforation signal and for winding up one frame.

However, if the time spent for detecting the film end is set to be long as in the conventional art, a motor will remain unrotated with the film being stretched at the film end. In this state, a rush current will flow through a coil of the motor for a long time, and the power loss in a motor driver circuit for driving the motor will be immense. If a motor driver circuit having a large current-carrying capacity is adopted, it is disadvantageous in its costs or volume.

In some cases, due to, for example, a new battery used, the film may be fed at a high speed and stretched suddenly at the film end so that the film will be broken. Further, a certain film cartridge may be broken because of its structure. At the worst, the film cartridge cannot be taken out.

SUMMARY OF THE INVENTION

In view of the above described problems, an object of this invention is to provide a film feeding apparatus which detects the end of a film by detecting the final frame of the film in order to prevent the film from being stretched.

In order to solve the above problems and attain the above object, this invention adopts the following means:

Namely, perforations provided to a film and having alternate intervals therebetween are detected, and a time period for passing a perforation is measured as for example by means for measuring the time lapse or period from the passing of one edge of a perforation to a passing of the other edge of the perforation to promptly detect the film feeding speed which is proper to the apparatus at that time, and the film end is logically judged by utilizing a time limit value (limiter) which represents a time limit before which a signal representing a perforation will be detected if another frame follows.

In detail, according to this invention, a film feeding apparatus of a camera capable of using a film having two perforations for each frame comprises detecting means for detecting passage of a perforation of the film and detecting a feeding speed of the film based on the distance between the front edge and rear edge of a perforation setting means for setting a limiter time period as a limit value in accordance with the detected feeding speed of the film; and film end determining means for determining that the film has ended when passage of another perforation is not detected within the set limiter time period while the film is wound up.

In a further aspect of this invention, the limiter time period is obtained by referring to a table, on the basis of the detected film feeding speed.

In a further aspect of this invention, the film end determining means stores information on the end of the film in a rewritable non-volatile memory.

The film feeding apparatus operates as follows:

By utilizing the fact that the film has two perforations for each frame at predetermined positions, the time period necessary for feeding a film portion between the second perforation of a frame and the first perforation of the next frame, if any, is predicted by predicting means on the basis of the film speed detected by the detecting means, and by the distance between the front edge and rear edge of the perforation and the predicted time period is set as the limiter time period. The film end determining means monitors whether the value counted from the detection of the second perforation exceeds the limiter time period. If it exceeds, the film is determined to be at its end, and is rewound.

An appropriate limiter time period is obtained on the basis of the table of relations between film feeding speeds and limiter time periods preset according to experiment.

The film end determining means uses the information on the film end stored in the rewritable non-volatile memory, such as an EEPROM.

DETAILED DESCRIPTION OF THE PREFERRED EMBODIMENTS

Referring to the drawings, embodiments of this invention will now be described.

[First Embodiment]

Figure 1:
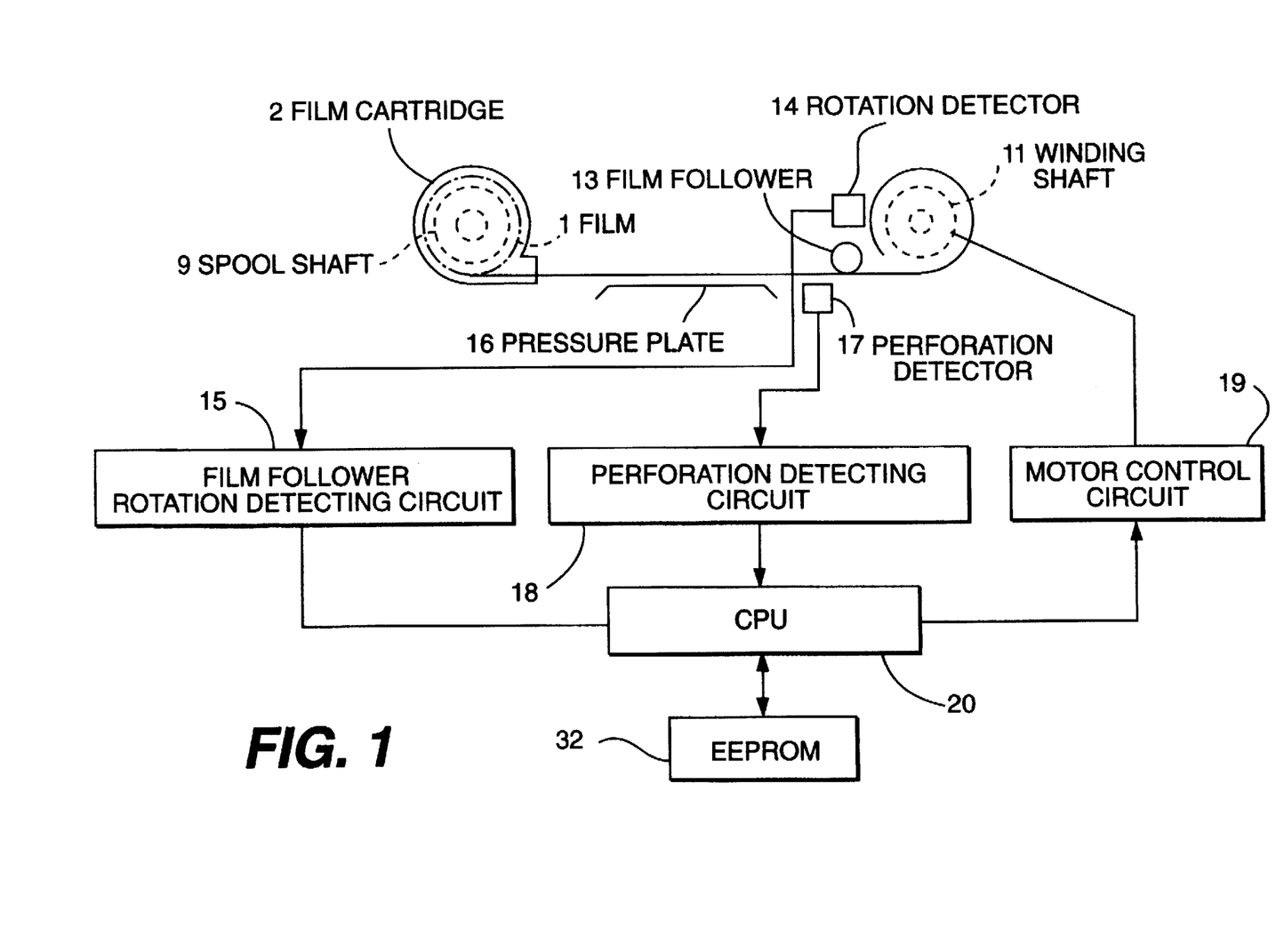
FIG. 1 is a schematic view showing a film feeding apparatus which is common to embodiments of this invention.
Figure 2:
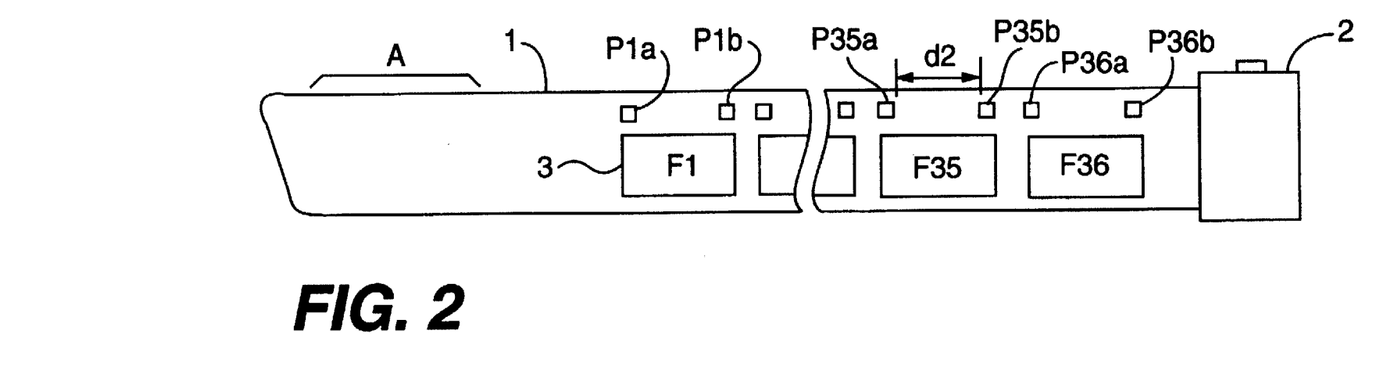
FIG. 2 is an illustration showing the format of a film used in the embodiments.
Figure 3:
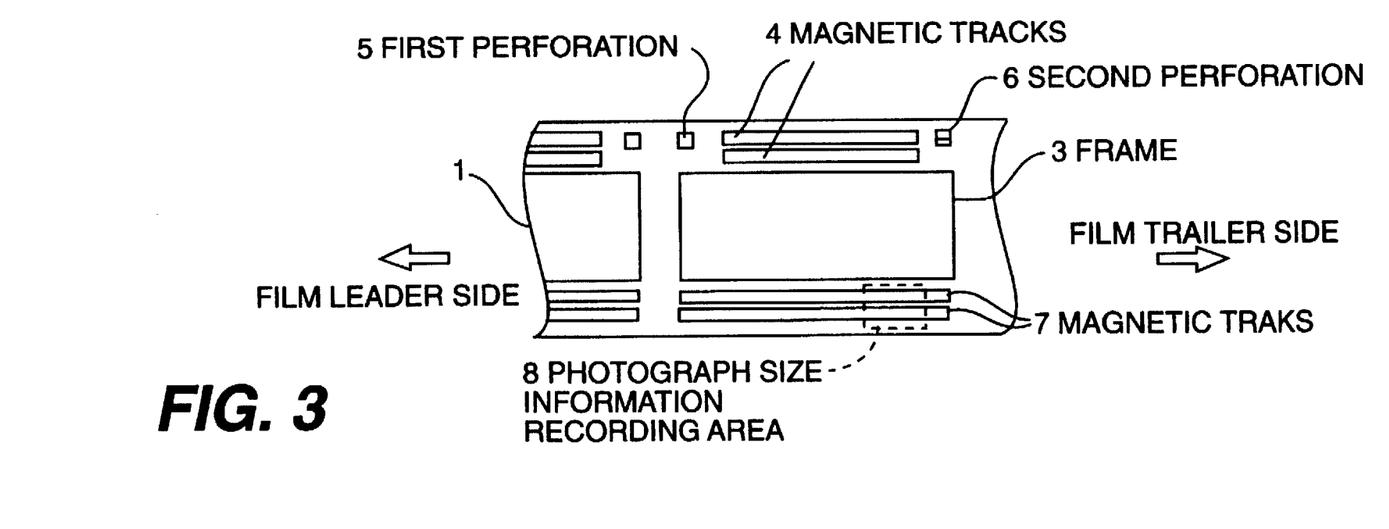
FIG. 3 is a partially enlarged view showing a frame of the film and its periphery.
Figure 4:
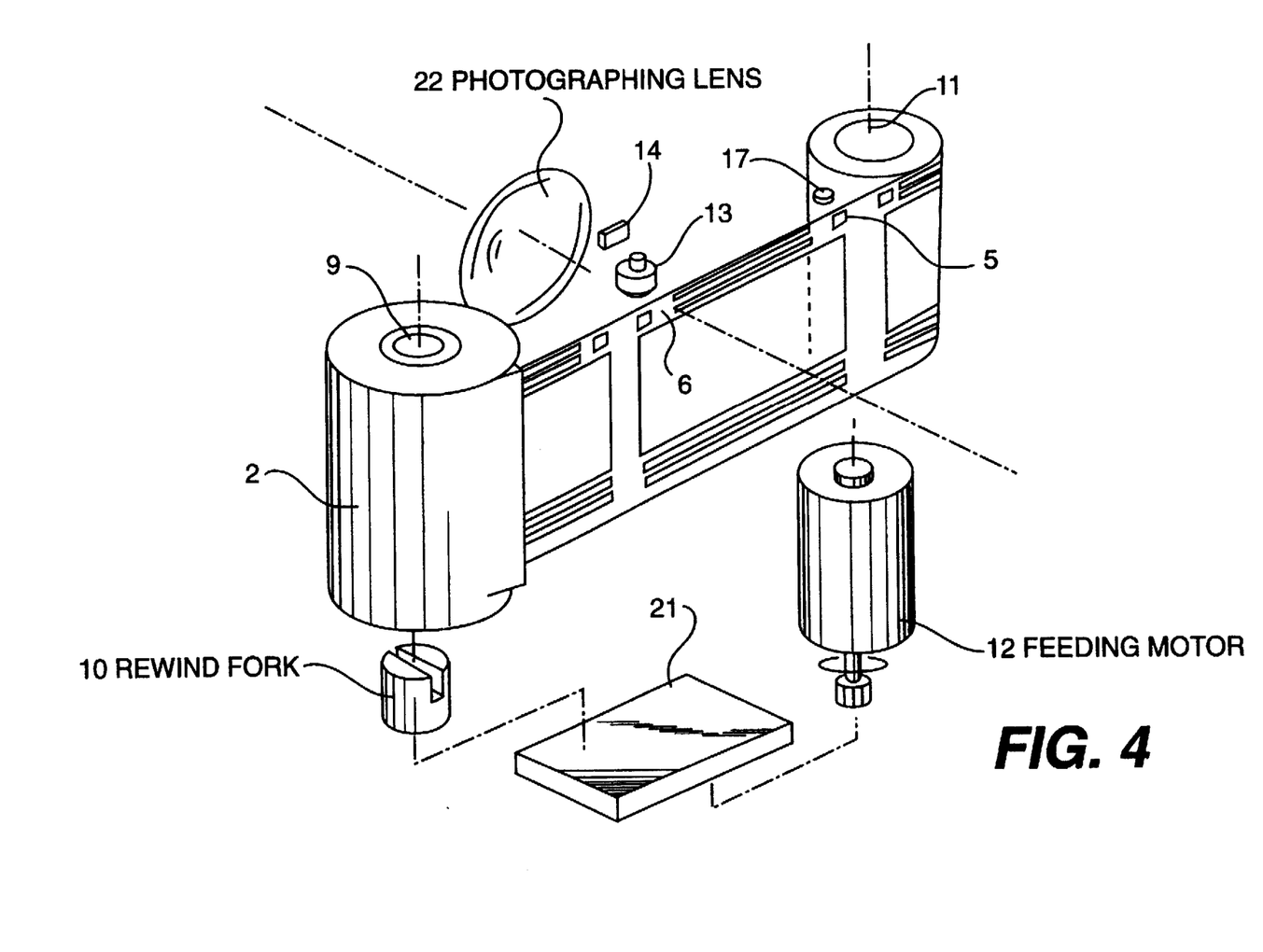
FIG. 4 is a perspective view showing a part of the inner side of a camera including the film feeding apparatus when the camera is on standby for photographing.

FIG. 1 is a schematic view of a film feeding apparatus of a camera common to the embodiments of this invention. The film used for the camera has such a format as shown in FIGS. 2 to 4.

First, referring to FIG. 1, the structure of the film feeding apparatus of the camera is described.

A film 1, the format of which is described below, is wound around a spool shaft 9 contained in a film cartridge 2. The film feeding apparatus of the camera comprises a rewind fork 10 (see FIG. 4) engaging the spool shaft 9; a winding shaft 11 provided on the camera side for winding up the film 1; a feeding motor 12 (see FIG. 4) for driving the winding shaft 11 and the spool shaft 9; a driving mechanism 21 (see FIG. 4) for transmitting the driving force of the feeding motor 12 to the rewind fork 10; and a motor control circuit 19 for controlling the drive of the feeding motor 12. The film feeding apparatus also includes a film follower 13 which presses against the film 1 and rotates as the film moves; a rotation detector (sensor) 14 for detecting the rotation of the film follower 13; a film follower rotation detecting circuit 15 for driving the rotation detector 14; and a pressure plate 16 for pressing the film. The film feeding apparatus further comprises a perforation detector (sensor) 17 for detecting a perforation of the film 1; a perforation detecting circuit 18; and a CPU 20 for controlling the above-mentioned component members.

The CPU 20 is coupled with a rewritable non-volatile memory 32 (for example, an EEPROM) for storing an adjustment value of the camera, a state of the camera, the number of exposed frames, and a photographing mode.

Detailed description of the film follower 13 is omitted, because it is described in Japanese Laid-Open Patent Application Publication No. Hei 8-76204.

Next, the film to be loaded into the film feeding apparatus of this invention will be described.

As shown in FIGS. 1 and 2, the film 1 is rolled up in the film cartridge 2. F1 to F36 in FIG. 2 represent frames 3. One perforation is placed above each of the front end and the rear end of each frame.

Out of the two perforations provided to the first frame F1 in FIG. 2, one provided on the film leader side is called the "first" perforation P1a, and the other provided on the film trailer side is called the "second" perforation P1b.

Thus, a thirty-six exposure roll such as shown in the example is provided also at its final frame F36 with perforations P36a and P36b. However, because no frame follows frame F36, no perforation follows perforation P36b. Therefore, perforation P36b is the final perforation to be detected in the film.

In FIG. 3, the periphery of a frame of the film is shown enlargedly. As shown in the drawing, the film 1 is provided, in the longitudinal direction above and below the frame 3 between the first and second perforations 5 and 6, with pairs 4 and 7, respectively, of parallel magnetic tracks for recording various kinds of photographing data. In the upper magnetic tracks 4, information can be also recorded optically.

In an area partially overlapping with the magnetic tracks 7 and surrounded by a broken line, a photograph size information recording area 8 is provided for recording optically, for example, information such as the size of the photograph to be printed.

FIG. 4 is a perspective view of the state of the inner side of the film feeding apparatus shown in FIG. 1 which is on standby for photographing. It reveals the positional relationship between the respective elements constituting the apparatus.

Next, a film feeding operation of the film feeding apparatus is described based on flowcharts which show a characteristic method of the first embodiment of this invention.

Figure 5:
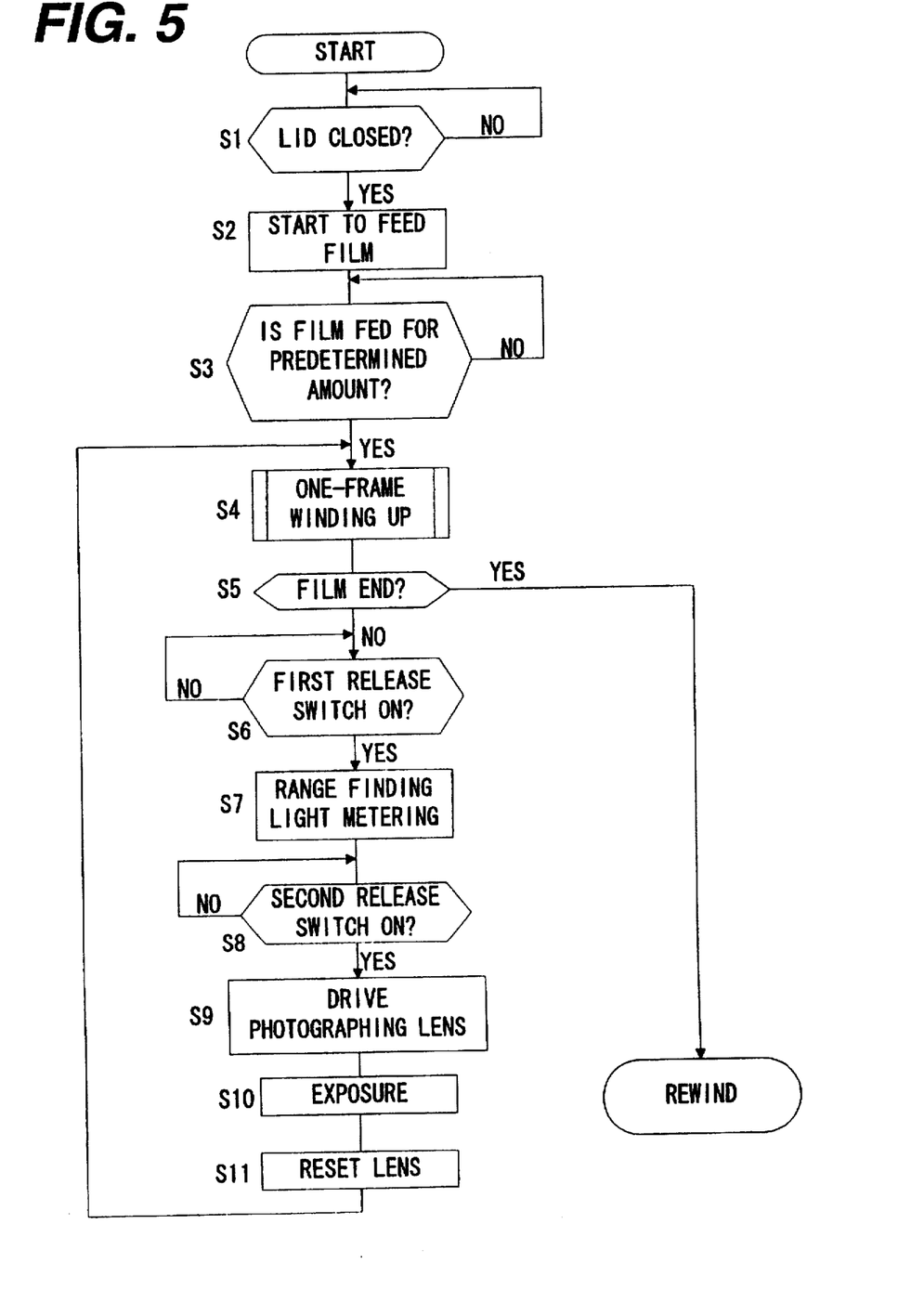
FIG. 5 is a flowchart which provides an overview of a release sequence of a camera which is common to the embodiments of this invention.

FIG. 5 is a flowchart showing a release sequence of a camera common to the embodiments of this invention, and FIGS. 7(a)–7(d) and 8(a)–8(d) are time charts showing operating waveforms of the respective control portions in the "one-frame winding up" step of the release sequence.

Figure 7A:
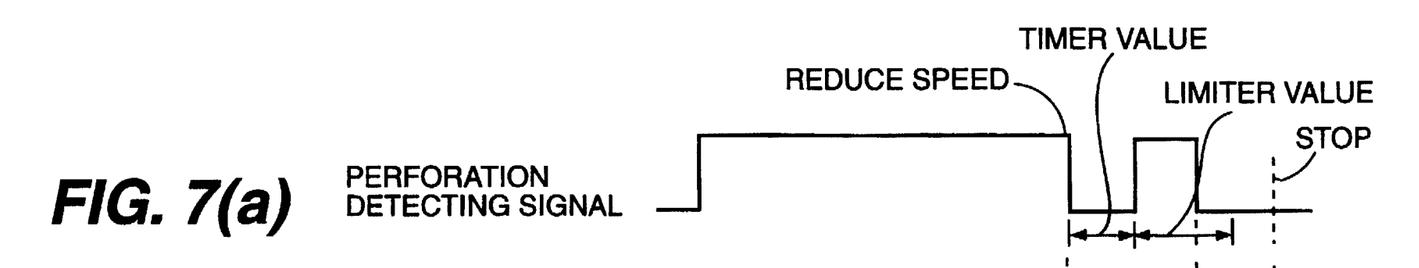
FIGS. 7(a), 7(b), 7(c) and 7(d) are graphs showing operation waveforms of control portions when a frame other than the final frame of the film is wound up in the "one-frame winding up" step in the flowchart of FIG. 5.
Figure 7B:
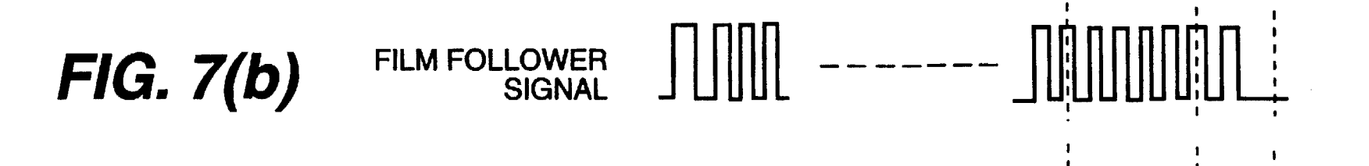
Figure 7C:
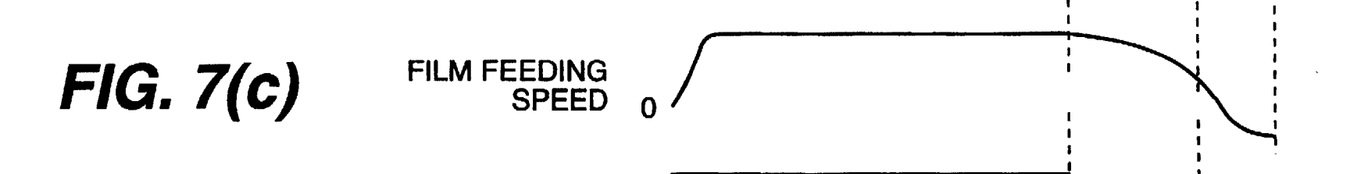
Figure 7D:
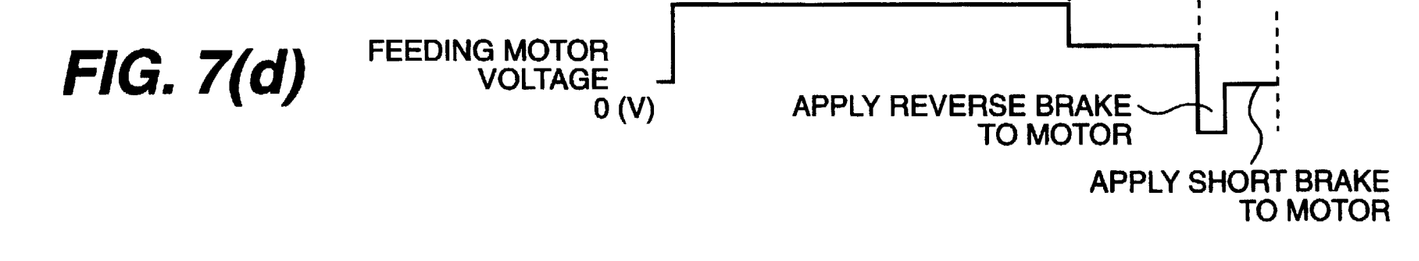

Particularly, FIGS. 7(a)–7(d) are time charts of winding up an ordinary frame, and FIGS. 8(a)–8(d) are time charts of winding up the final frame. In detail, FIG. 7(a) shows a perforation detecting waveform, FIG. 7 (b) shows a film follower rotation detecting waveform, FIG. 7(c) shows a film feeding speed, and FIG. 7(d) shows a feeding motor driving voltage.

According to FIG. 5, the release sequence is executed as follows: A film cartridge 2 with an unused film is loaded into the camera. Then, whether the lid is open or has been closed is detected (step S1). When the lid has been closed, the feeding of the film 1 starts, and the leader portion of the film is wound around the spool shaft 9 (step S2).

Then, it is decided whether the film 1 has been fed for a predetermined amount (step S3).

When the film 1 has been fed for the predetermined amount, the film is further wound up by one frame (step S4). The film stops at the first frame (F1) where photographing is possible. As will be described afterwards, the predetermined amount is set in terms of a predetermined number of rotation (or number of pulses) of the film follower 13 and the detection of a perforation.

Next, it is determined whether the film end has been reached (step S5). As explained in the below-mentioned "one-frame winding up" subroutine, information about the film end is stored in the EEPROM. When the film end is reached, the film 1 is rewound into the film cartridge 2 and the sequence is finished, whereas when the film end is not yet determined, the film 1 remains on standby for photographing, as shown in FIG. 4.

When the turning on (depression) of a first release switch (not shown) is detected (step S6), predetermined range finding and light metering are performed by a range-finding device and a light metering device (not shown), respectively (step S7).

When the turning on of a second release switch (not shown) is detected (step S8), a photographing lens 22 is driven (step S9) and an appropriate exposure is made (step S10), based on the values obtained by the range finding and the light metering.

When the exposure is finished, the photographing lens 22 is reset to its initial position (step S11). In order to prepare for the next photographing operation, the process returns to step S4 and restarts from the step of "one-frame winding up." While one frame is being wound up, the film follower 13 rotates and pulses corresponding to the displacement of the film 1 as shown in FIG. 7(b) are generated by the rotation detector 14 and the film follower rotation detecting circuit 15.

Now, referring to a flowchart of FIG. 6, the subroutine of "one-frame winding up" (S4) in FIG. 5 will be described in detail by also referring to the signal waveforms of FIGS. 7(a)–7(d) and 8(a)–8(d). The description will be made by taking as an example the case in which frame F1 of the film (see FIG. 2) has been exposed and the film is wound up to next frame F2 to set the camera to its standby state.

Figure 6:
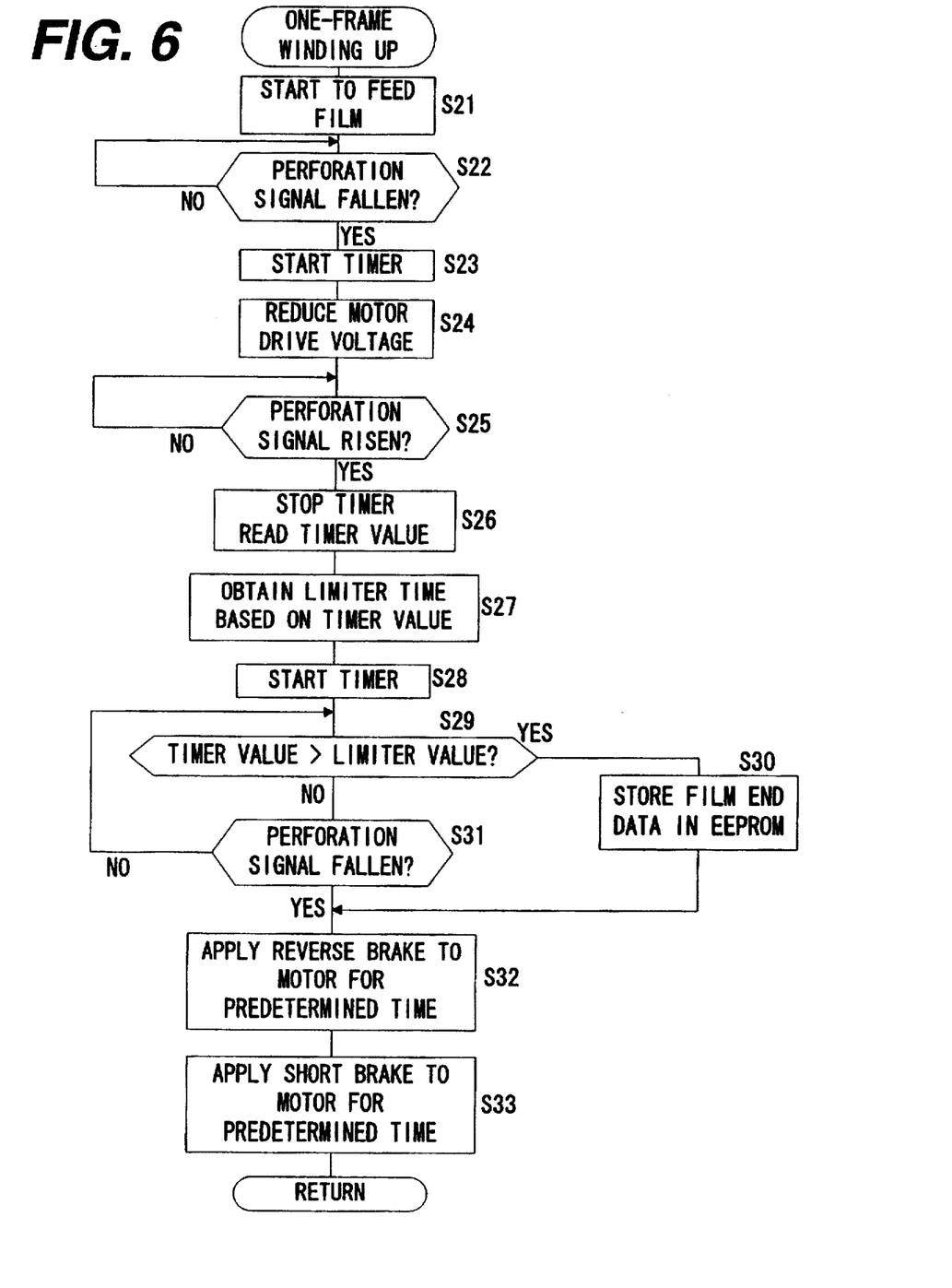
FIG. 6 is a flowchart of a subroutine of winding up one frame of the film feeding apparatus of a first embodiment of this invention.

When a frame has been exposed to take a photograph, the subroutine of FIG. 6 is called and the operation of feeding the next frame is started (step S21). At this time, pulses of the film follower signal as shown in FIGS. 7(b) and 8(b) are output.

Figure 8A:
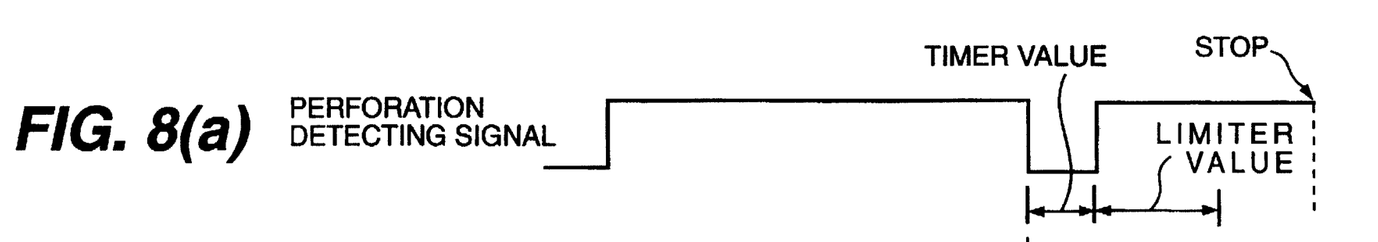
FIGS. 8(a), 8(b), 8(c) and 8(d) are graphs showing operation waveforms of the control portions when the final frame of the film is wound up in the "one-frame winding up" step in the flowchart of FIG. 5.
Figure 8B:
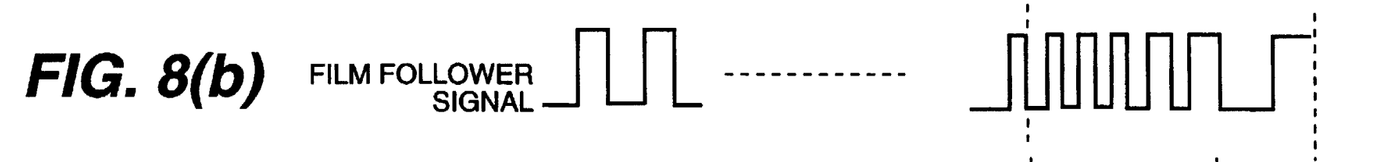
Figure 8C:
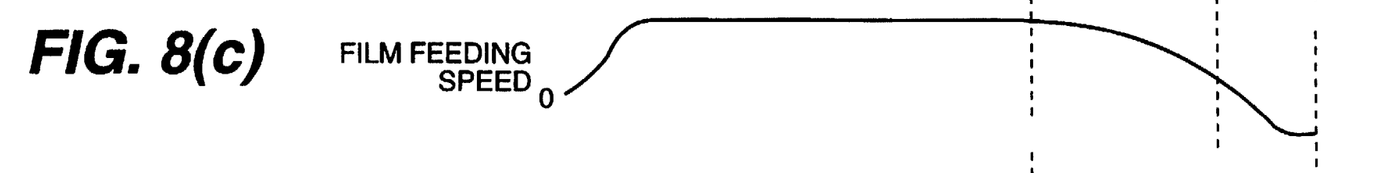
Figure 8D:
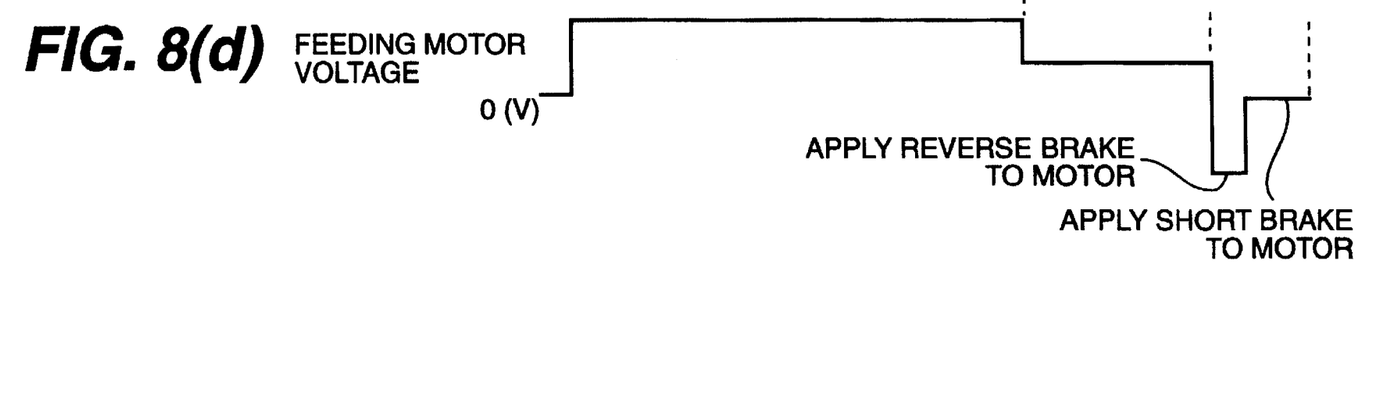

When the detection signal of the second perforation 6 of frame F1, namely the falling of the signal shown in FIGS. 7(a) and 8(a) is detected (step S22), a timer is started to count the film feeding speed (step S23).

Then, a minimum driving voltage is set for the motor (step S24) in order to easily apply the brake when the film feeding is stopped, so that the film can be precisely stopped. The minimum driving voltage is set to be the minimum battery voltage at which the camera system can still operate even when the battery becomes weak.

When the rising of the perforation signal is detected (step S25), the timer is stopped and the timer value is read (step S26).

Figure 11:
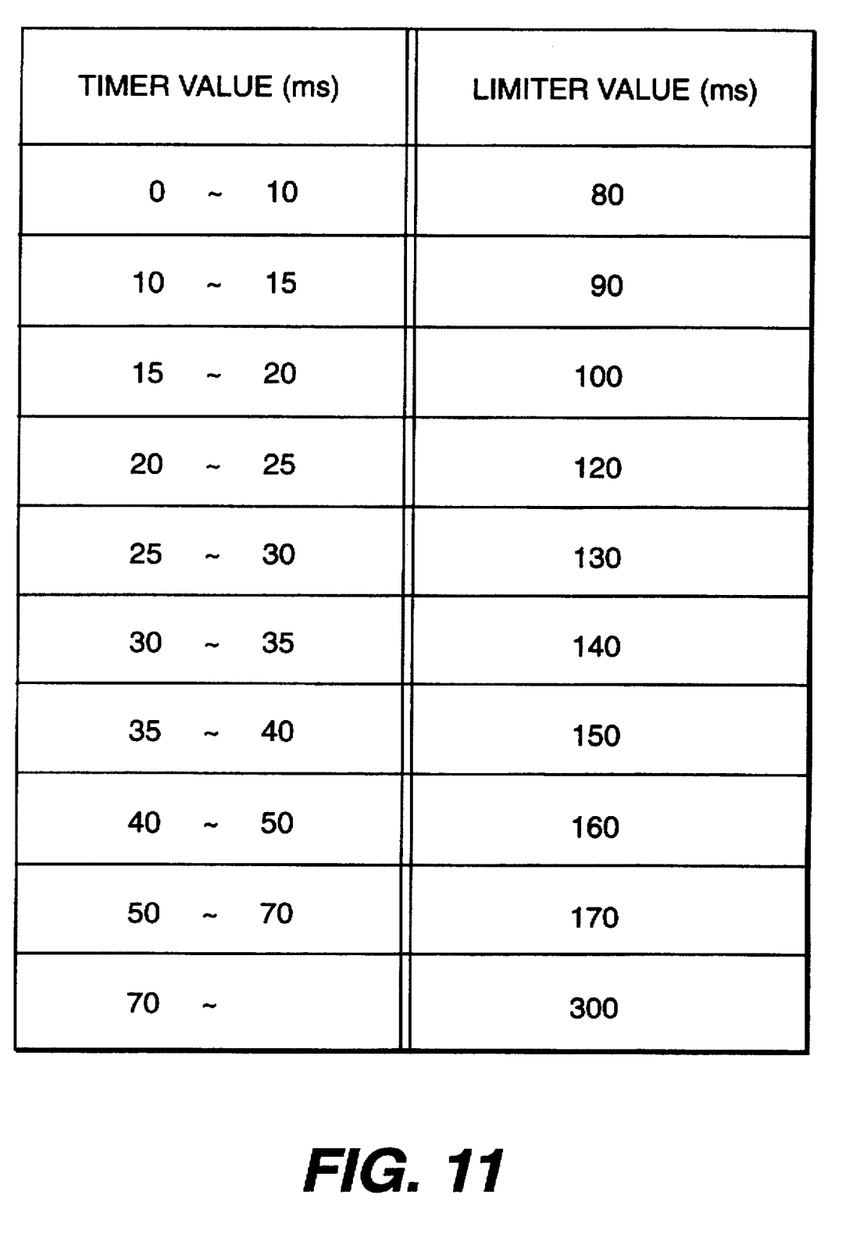
FIG. 11 is a table of limiter values corresponding to timer values.

Then, based on the timer value, the limiter time until which the next perforation is detected is obtained (step S27). The timer value is calculated according to the following equation or obtained by referring to table 1 of FIG. 11. Also, other ways may be used to determine the limiter time.

Limiter time=coefficient 1×timer value +coefficient 2

Coefficients 1 and 2 of the above equation are set based on the results of experiment. For example, coefficient 1=2.5 and coefficient 2=50.

When adopting a CPU having a slow computing speed, it is preferable to use a predetermined table. That is, the limiter value corresponding to the timer value is obtained by referring to the predetermine table, such as table 1 of FIG. 11. In this table, the limter value is set such that the film is not stretched at the film end. The limiter value thus obtained is stored.

Then, the timer is reset and restarted (step S28).

Next, the present timer value is monitored, and it is decided whether the timer value exceeds the limiter value (step S29).

If the timer value has not exceeded the limiter value, it is detected whether the perforation detecting signal has fallen (step S31). If the timer value has exceeded the limiter value, it means that the film is at its end, and the predetermined data representing the state of film end is stored in the EEPROM (step S30).

If the falling of the perforation detecting signal is detected in step S31 or the film end is detected, a reverse brake is applied to the motor for a predetermined time (for example, 20 msec) (step S32). Then, a short brake is applied to the motor for a predetermined time (for example, 100 msec) (step S33).

Now, the operation for winding up one frame is finished, and the process returns to just after step S4 of the camera sequence.

According to this embodiment, when the film end is decided based on the detection of the perforations, the timing at which the next perforation may be detected is predicted by taking the state of the film feeding apparatus into consideration, and the time for waiting (namely, the limiter time) is set, in accordance with the "one-frame winding up" routine shown in FIG. 6. Thus, it is possible to provide a film feeding apparatus which can detect the film end without unnecessarily stretching the film and rewind the film.

[Second Embodiment]

A second embodiment of this invention also adopts the method of detecting the film end by the limiter time as described in the first embodiment. In addition, the second embodiment adopts a method in which the pulse number of the film follower is counted from the start of the film feeding, and the film end is detected if there is no output representing the first perforation of the next frame until the pulse number of the film follower is counted up to a predetermined number including a predetermined allowance.

Figure 9:
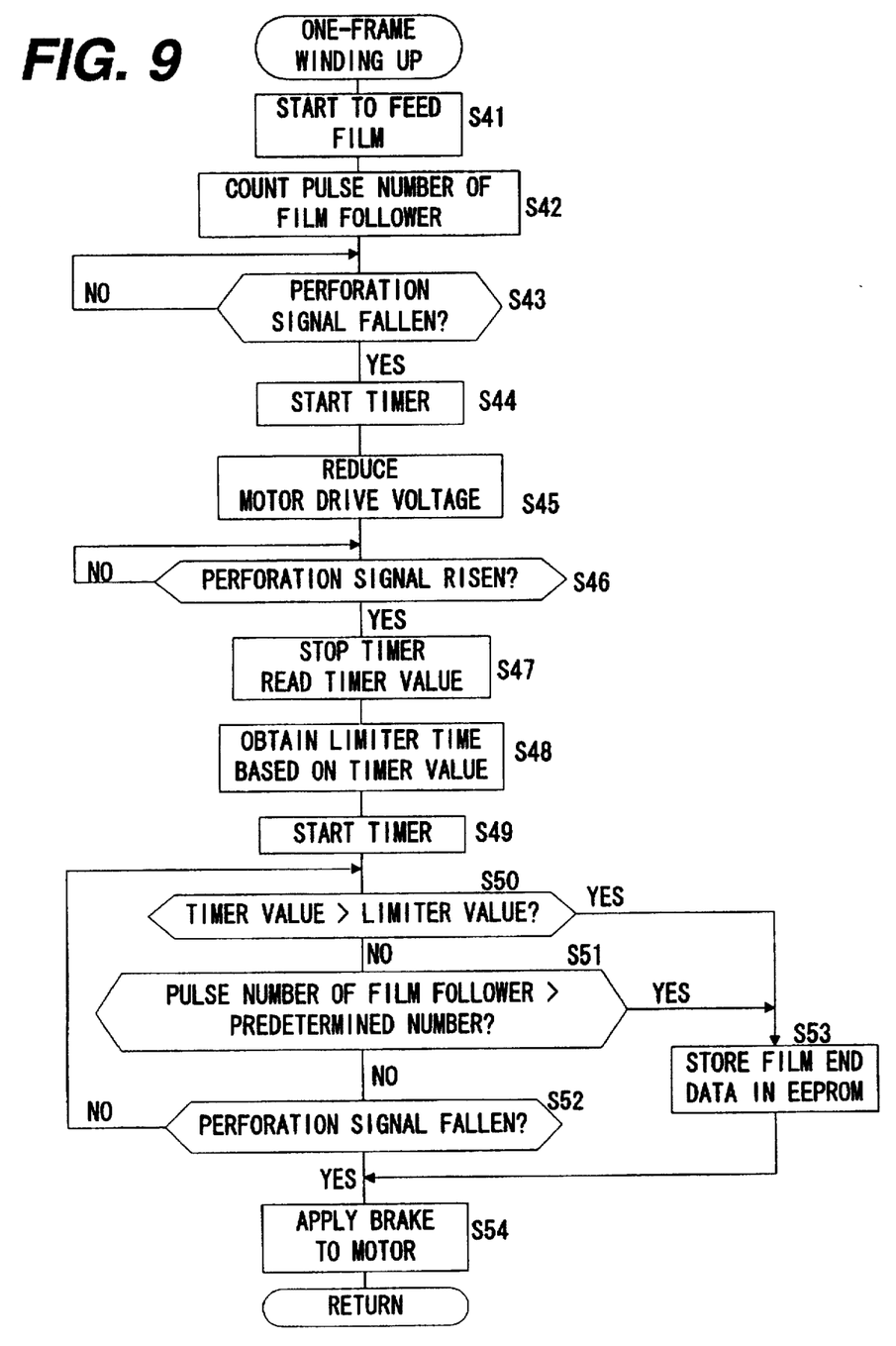
FIG. 9 is a flowchart of a subroutine of winding up one frame of the film feeding apparatus of a second embodiment of this invention.

Referring to the flowchart of FIG. 9, this method will be described in detail by concentrating on steps S42 and S51 added to the flowchart of FIG. 6, and also referring to the signal waveforms of FIGS. 7 and 8.

First, the film feeding starts (step S41), then the pulse number of the film follower as shown in FIGS. 7(b) and 8(b) is counted (step S42).

Steps S43 to S50 are the same as steps S22 to S29 in FIG. 6.

Next, it is determined whether the pulse number of the film follower has exceeded the predetermined number (step S51). If it has exceeded, it is decided that the film end has been reached and the process proceeds to step S53 to store the data representing the state of the film end in the EEPROM.

Steps S52, S53, and S54 are the same as steps S30, S31, S32, and S33 in FIG. 6.

In this embodiment, upon the start of the film feeding in the first step S41, the counting of the pulse number of the film follower is started in step S42. A pulse number of the film follower to be outputted until the first perforation of the next frame should be detected, plus a sufficient allowance is set as a predetermined pulse number. If the first perforation of the next frame is not detected until the pulse number is counted up to the predetermined number, the film end is determined at step S51. Thus, according to this embodiment, the precision of the counting can be enhanced based on the pulse number.

[Third Embodiment]

Although a third embodiment of this invention is approximately the same as the second embodiment, the third embodiment is characterized in that the pulse number of the film follower is counted from the rising of the perforation signal in order to count the pulses more precisely. The pulses of the film follower are a signal outputted in accordance with the rotation of the film follower 13. However, if the press contact of the film 1 and the film follower 13 by the pressure plate 16 is weaker than a determined value, the film follower 13 will slip on the surface of the film 1 and will not rotate regularly. Thus, correct pulses may not be outputted, and there will be a missing pulse portion in the pulse wave. In order to improve the precision of counting, the pulses are counted in a time interval as short as possible.

Referring to the flowchart of FIG. 10, this method will be described in detail by concentrating on step S69 which is different from FIGS. 6 and 9, and also referring to the signal waveforms of FIGS. 7(a)–7(d) and 8(a)–8(d).

Figure 10:
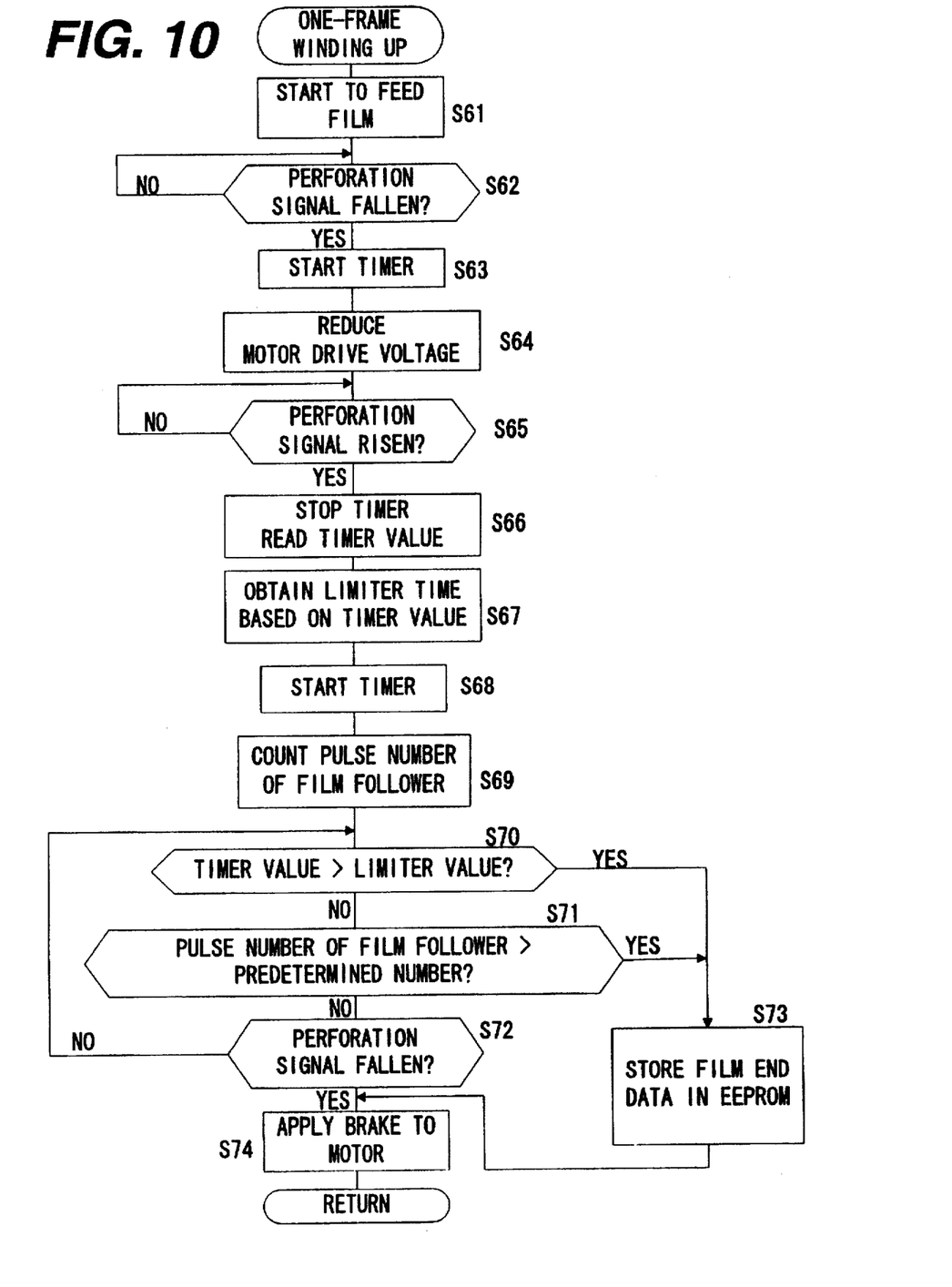
FIG. 10 is a flowchart of a subroutine of winding up one frame of the film feeding apparatus of a third embodiment of this invention.

Steps S61 to S68 of FIG. 10 are the same procedures as in the first embodiment.

In the next step S69, the counting of the pulses of the film follower is started upon the rising of the perforation signal.

The procedures of steps S70, S72 to S74 are the same as steps S29 to S33 of FIG. 6 described in the first embodiment.

In this embodiment, not at the initial stage of one-frame winding, but in step S69 after the limiter time has been calculated and set, the counting of the pulses of the film follower is started upon the rising of the perforation signal. Consequently, according to this embodiment, the pulses of the film follower can be counted more accurately.

There is another method in which the width of a pulse of the film follower is detected to determine the feeding speed, and the film end is detected as in the first embodiment.

A plurality of embodiments have been described above. In addition to the embodiments, there may also be variations of the embodiments which remain within the gist of this invention.

As described above, the film feeding apparatus according to this invention can achieve the following effects:

The film end can be detected accurately based on a current film feeding speed proper to the film feeding apparatus. Therefore, the film will not be stretched and a rush current of the motor can be prevented.

Also, a film cartridge can be prevented from being broken by a stretched film.

What is claimed is:

1. A film feeding apparatus of a camera capable of using a film having two perforations for each frame, each of said perforations including a front edge and a rear edge, the apparatus comprising:
   detecting means for detecting a feeding speed of the film by measuring time lapse from a passing of the front edge of a perforation to a passing of the rear edge of the perforation;
   setting means for setting a limiter time period as a limit value in accordance with the detected feeding speed of the film; and
   film end determining means for determining that the film has ended when passage of another perforation is not detected within the set limiter time period while the film is wound up;
   whereby the film feeding apparatus detects the end of the film before the film is stretched.

2. A film feeding apparatus according to claim 1, wherein the limiter time period is obtained by referring to a table, on the basis of the detected film feeding speed.

3. A film feeding apparatus according to claim 1, wherein the film end determining means stores information on the end of the film in a rewritable non-volatile memory.

4. A film feeding apparatus of a camera capable of using a film having two perforations for each frame, each of said perforations including a front edge and a rear edge, the apparatus comprising;
   detecting means for detecting a signal corresponding to a passing of the front edge and the rear edge of a perforation of the film and outputted in accordance with feeding of the film, and for outputting a predetermined detecting signal;
   speed detecting means for detecting a feeding speed of the film on the basis of the detecting signal outputted by the detecting means;
   calculating means for determining a limiter time periods which is set shorter as the feeding speed is higher and is set longer as the feeding speed is lower, as a predetermined time limit, on the basis of the feeding speed detected by the speed detecting means; and
   film end determining means for determining that the film has ended when the detecting signal is not outputted by the detecting means within the limiter time period;
   wherein the apparatus rewinds the film when the end of the film is determined.

5. A film feeding apparatus according to claim 4, wherein the calculating means has a table showing a relationship between the film feeding speed and the limiter time period, and obtains a value of the limiter time period corresponding to the detected film feeding speed by retrieving the table.

6. A film feeding apparatus according to claim 4 further including a rewritable non-volatile memory, wherein the film end determining means stores information on the end of the film in the rewritable non-volatile memory.

7. A film feeding apparatus of a camera using a film, each frame of the film having a first perforation on its leader side and a second perforation on its trailer side, each of said perforations including a front edge and a rear edge, the apparatus comprising;
   detecting means for detecting movement of the first and second perforations due to feeding of the film, and for outputting a first detecting signal and a second detecting signal corresponding to the front edge and the rear edge, respectively, of each of the perforations;
   predicting means for predicting, on the basis of a feeding speed of the film calculated on the basis of a time interval between the first and second detecting signals of the second perforation of a current frame outputted by the detecting means and a distance between the front edge and the rear edge of the perforation, output timing of the first detecting signal of the first perforation of a following frame; and
   controlling means for stopping the feeding of the film when the first detecting signal of the first perforation of the following frame is outputted or when the detecting means has not outputted the first detecting signal of the first perforation of the following frame within the output timing predicted by the predicting means;
   whereby the film feeding apparatus detects the end of the film before the film is stretched.

8. A film feeding apparatus according to claim 7, wherein the detecting means optically detects the movement of the perforations.

9. A film feeding apparatus according to claim 7, wherein the predicting means predicts the output timing by referring to a predetermined table showing a relationship between the time interval and the output timing.

10. A film feeding apparatus according to claim 7, wherein the controlling means rewinds the film after stopping the feeding of the film when the detecting means has not outputted the first detecting signal of the first perforation of the following frame within the output timing predicted by the predicting means.

11. A film feeding apparatus for feeding a film having two perforations for each frame, each of said perforations including a front edge and a rear edge, the apparatus comprising:

means for detecting passage of a perforation of the film and for measuring time lapse from a passing of the front edge of a perforation to a passing of the rear edge of the perforation while the film is fed;

means for detecting a feeding speed of the film to set a limiter period for determining the end of the film; and means for determining that the film has ended when passage of another perforation is not detected within the set limiter time period while the film is wound up;

wherein the limiter time period is set to be shorter than a time period between a time point when feeding of the film is started after the final frame is exposed and a time point when the film is stretched.

12. An apparatus for feeding a film, comprising:

means for detecting a feeding speed of the film by measuring time lapse from a passing of a front edge of a perforation to a passing of a rear edge of the perforation;

means for setting, in accordance with the detected feeding speed, a limiter time period for determining the end of the film; and means for determining, before the film is stretched, the end of the film when the limiter time period has passed while the film is fed;

whereby the apparatus detects the end of the film before the film is stretched.

13. A film feeding apparatus of a camera capable of using a film having two perforations for each frame, each of said perforations including a front edge and a rear edge, the apparatus comprising:

detecting means for detecting passage of a perforation of the film and detecting a feeding speed of the film by measuring time lapse from a passing of the front edge of a perforation to a passing of the rear edge of the perforation;

setting means for setting a limiter time period as a limit value in accordance with the detected feeding speed of the film; and determining means for determining that the film has ended when winding up of a following frame is not completed within the set limiter time period while the film is wound up;

whereby the film feeding apparatus detects the end of the film before the film is stretched.

14. A film feeding apparatus of a camera capable of using a film having two perforations for each frame, each of said perforations including a front edge and a rear edge, the apparatus detecting passage of a perforation of the film due to feeding of the film, and applying a brake in accordance with passage of a front perforation of a following frame, the apparatus comprising:

detecting means for detecting passage of the perforation of the film and detecting a feeding speed of the film by measuring time lapse from a passing of the front edge of a perforation to a passing of the rear edge of the perforation;

setting means for setting a limiter time period as a limit value in accordance with the detected feeding speed of the film; and determining means for determining that the film has ended when the passage of the front perforation of the following frame is not detected within the set limiter time period while the film is wound up;

whereby the apparatus detects the end of the film before the film is stretched.

15. A film feeding apparatus of a camera capable of using a film having two perforations for each frame, each of said perforations including a front edge and a rear edge, the apparatus comprising:

detecting means for detecting a feeding speed of the film by measuring time lapse from a passing of the front edge of a perforation to a passing of the rear edge of the perforation;

setting means for setting a limiter time period as a limit value in accordance with the detected feeding speed of the film; and determining means for determining that the film has ended when no perforation is detected within the set limiter time period while the film is wound up;

whereby the apparatus detects the end of the film before the film is stretched.

* * * * *